(12) United States Patent
Craddock et al.

(10) Patent No.: US 7,093,024 B2
(45) Date of Patent: Aug. 15, 2006

(54) END NODE PARTITIONING USING VIRTUALIZATION

(75) Inventors: David F. Craddock, New Paltz, NY (US); David Arlen Elko, Austin, TX (US); Thomas Anthony Gregg, Highland, NY (US); Gregory Francis Pfister, Austin, TX (US); Renato John Recio, Austin, TX (US); Donald William Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 09/965,005

(22) Filed: Sep. 27, 2001

(65) Prior Publication Data

US 2003/0061379 A1   Mar. 27, 2003

(51) Int. Cl.
*G06F 15/173* (2006.01)

(52) U.S. Cl. .................. 709/238; 709/249; 370/341

(58) Field of Classification Search .............. 370/389, 370/392, 394, 431, 254; 710/22; 711/163; 709/223, 228, 245, 249, 238; 719/321, 324, 719/327
See application file for complete search history.

(56) References Cited

U.S. PATENT DOCUMENTS

| | | | | |
|---|---|---|---|---|
| 5,822,319 A * | 10/1998 | Nagami et al. | ............. | 370/392 |
| 6,085,238 A * | 7/2000 | Yuasa et al. | ................ | 709/223 |
| 6,438,128 B1 * | 8/2002 | Kashyap | ...................... | 370/389 |
| 6,438,612 B1 * | 8/2002 | Ylonen et al. | .............. | 709/249 |
| 6,459,698 B1 * | 10/2002 | Acharya | ..................... | 370/392 |
| 6,578,122 B1 * | 6/2003 | Beukema et al. | ........... | 711/163 |
| 6,594,712 B1 * | 7/2003 | Pettey et al. | ................. | 710/22 |
| 6,597,699 B1 * | 7/2003 | Ayres | ......................... | 370/400 |
| 6,674,756 B1 * | 1/2004 | Rao et al. | .............. | 370/395.21 |
| 6,687,220 B1 * | 2/2004 | Ayres | ......................... | 370/229 |
| 6,694,361 B1 * | 2/2004 | Shah et al. | .................. | 709/222 |
| 6,717,913 B1 * | 4/2004 | Ghahremani et al. | ....... | 370/230 |
| 6,744,765 B1 * | 6/2004 | Dearth et al. | ............... | 370/394 |
| 6,789,118 B1 * | 9/2004 | Rao | ........................... | 709/225 |
| 6,850,531 B1 * | 2/2005 | Rao et al. | ................... | 370/401 |
| 6,885,667 B1 * | 4/2005 | Wilson | ...................... | 370/392 |
| 6,889,380 B1 * | 5/2005 | Shah | .......................... | 719/327 |
| 6,914,905 B1 * | 7/2005 | Yip et al. | ............. | 370/395.53 |

OTHER PUBLICATIONS

Sancho et al. "Effective strategy to compute forwarding tables for infiniband network" 2001 IEEE, pp. 48-57 (publication date: Sep. 3-7, 2001).*

Lopez et al. "Deadlock-free routing in infiniband through destination renaming" 2001 IEEE, pp. 427-434 (publication date: Sep. 3-7, 2001).*

* cited by examiner

*Primary Examiner*—William Thomson
*Assistant Examiner*—Van Nguyen
(74) *Attorney, Agent, or Firm*—Duke W. Yee; Thomas E. Tyson; Francis Lammes

(57) ABSTRACT

A mechanism for allowing a single physical IB node to virtualize a plurality of host channel adapters is provided. This includes providing the appearance of both a router and multiple virtual HCA's residing behind that router, to the external REAL subnet components. Each virtual host channel adapter will have unique access control levels. One or more InfiniBand subnets are virtualized in such a way that nodes residing both within the virtual subnets and in separate physical subnets are completely unaware of the virtualization. This virtualization of InfiniBand subnets significantly increases the horizontal scaling capabilities of a single InfiniBand physical component, while at the same time provides "native" network throughput for all the virtual hosts.

15 Claims, 5 Drawing Sheets

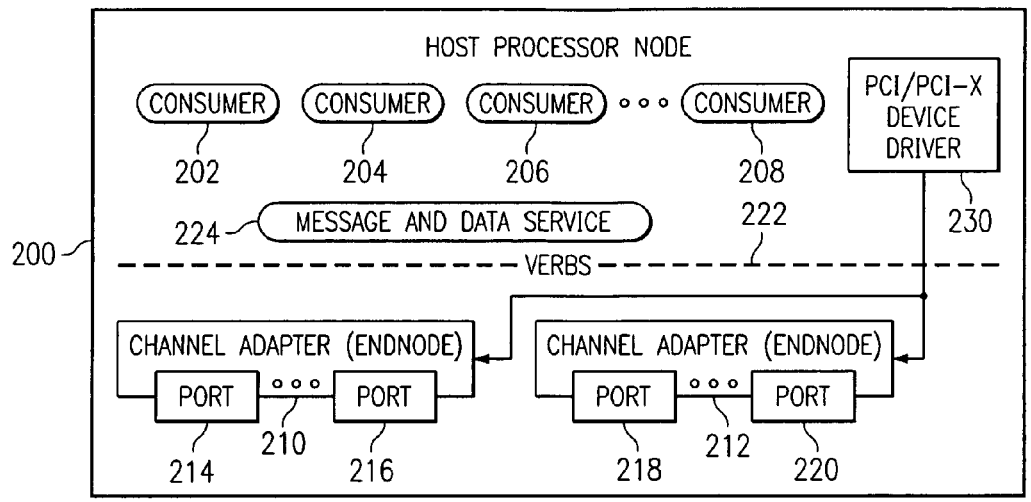
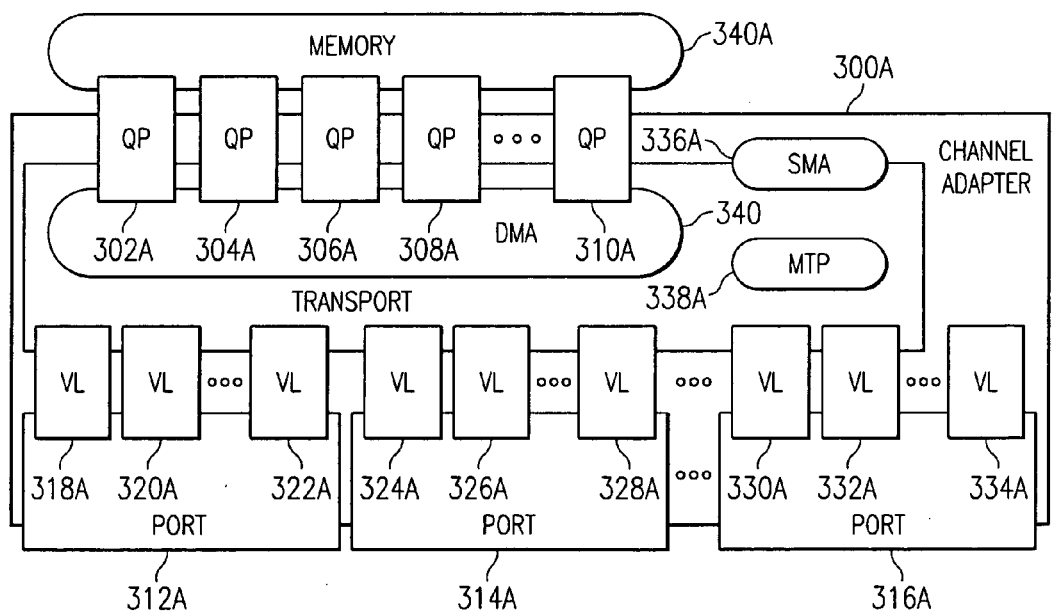

US 7,093,024 B2

1

END NODE PARTITIONING USING VIRTUALIZATION

BACKGROUND OF THE INVENTION

1. Technical Field

The present invention relates generally to communications between computer systems and, more particularly, to a method and apparatus for a single InfiniBand chip which can support end node partitioning by enabling virtualization of an InfiniBand Host Channel Adapter (HCA) and router components.

2. Description of Related Art

In a System Area Network (SAN), the hardware provides a message passing mechanism which can be used for Input/Output devices (I/O) and interprocessor communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different defined transport types: Reliable Connected (RC), Reliable datagram (RD), Unreliable Connected (UC), Unreliable Datagram (UD), and Raw Datagram (RawD). In addition, there is a set of manufacturer definable operation codes that allow for different companies to define custom packets that still have the same routing header layouts. Consumers retrieve the results of the defined messages from a completion queue (CQ) through SAN send and receive work completions (WC). The manufacturer definable operations are not defined as to whether or not they use the same queuing structure as the defined packet types. Regardless of the packet type, the source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

The InfiniBand network is broken up into separate autonomous management units (each containing multiple IB nodes) called subnets. InfiniBand components are assigned a Global Identifier (GID) during initialization. The GID is used to uniquely identify the target component both within and across IB subnets. Communications among components that reside in different IB subnets are provided by including an additional header called a Global Routing Header (GRH) being included in every IB packet, defining both the source and the destination addresses/nodes. These additional addresses allow routers that span subnets to determine the path that is to be taken for the packet to reach its ultimate destination (i.e. target GID). Unlike within subnet communications where a direct path can be obtained to the target (i.e. LID), cross subnet communications typically requires one or more hops through intermediate router(s).

InfiniBand does not define a mechanism that allows a single physical IB node (e.g. a host channel adapter) to transparently implement one or more entire IB subnets. However, a single physical IB node transparently implementing one or more entire IB subnets becomes a highly desirable feature, especially for environments where a large number of servers (e.g., Linux) are implemented within a single physical machine (e.g., IBM's z/VM).

Therefore, a mechanism is needed in environments containing a large number of servers to allow economies of scale cost reductions to be achieved by sharing a single physical IB node across potentially many server images. This mechanism must not incur significant mainline processing overheads and must allow the resulting overall solution to be competitive within the marketplace.

SUMMARY OF THE INVENTION

The present invention provides a mechanism for allowing a single physical IB node to virtualize a plurality of host channel adapters. This includes providing the appearance of both a router and multiple virtual HCA's residing behind that router, to the external REAL subnet components. Each virtual host channel adapter will have unique access control levels. One or more InfiniBand subnets are virtualized in such a way that nodes residing both within the virtual subnets and in separate physical subnets are completely unaware of the virtualization. This virtualization of InfiniBand subnets significantly increases the horizontal scaling capabilities of a single InfiniBand physical component, while at the same time provides "native" network throughput for all the virtual hosts.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a functional block diagram of a host processor node in accordance with a preferred embodiment of the present invention;

FIG. 3A depicts a diagram of a host channel adapter in accordance with a preferred embodiment of the present invention;

DETAILED DESCRIPTION OF THE PREFERRED EMBODIMENT

The present invention provides a network computing system having end nodes, switches, routers, and links interconnecting these components. The end nodes segment the message into packets and transmit the packets over the links. The switches and routers interconnect the end nodes and route the packets to the appropriate end node. The end nodes reassemble the packets into a message at the destination.

Figure 1:
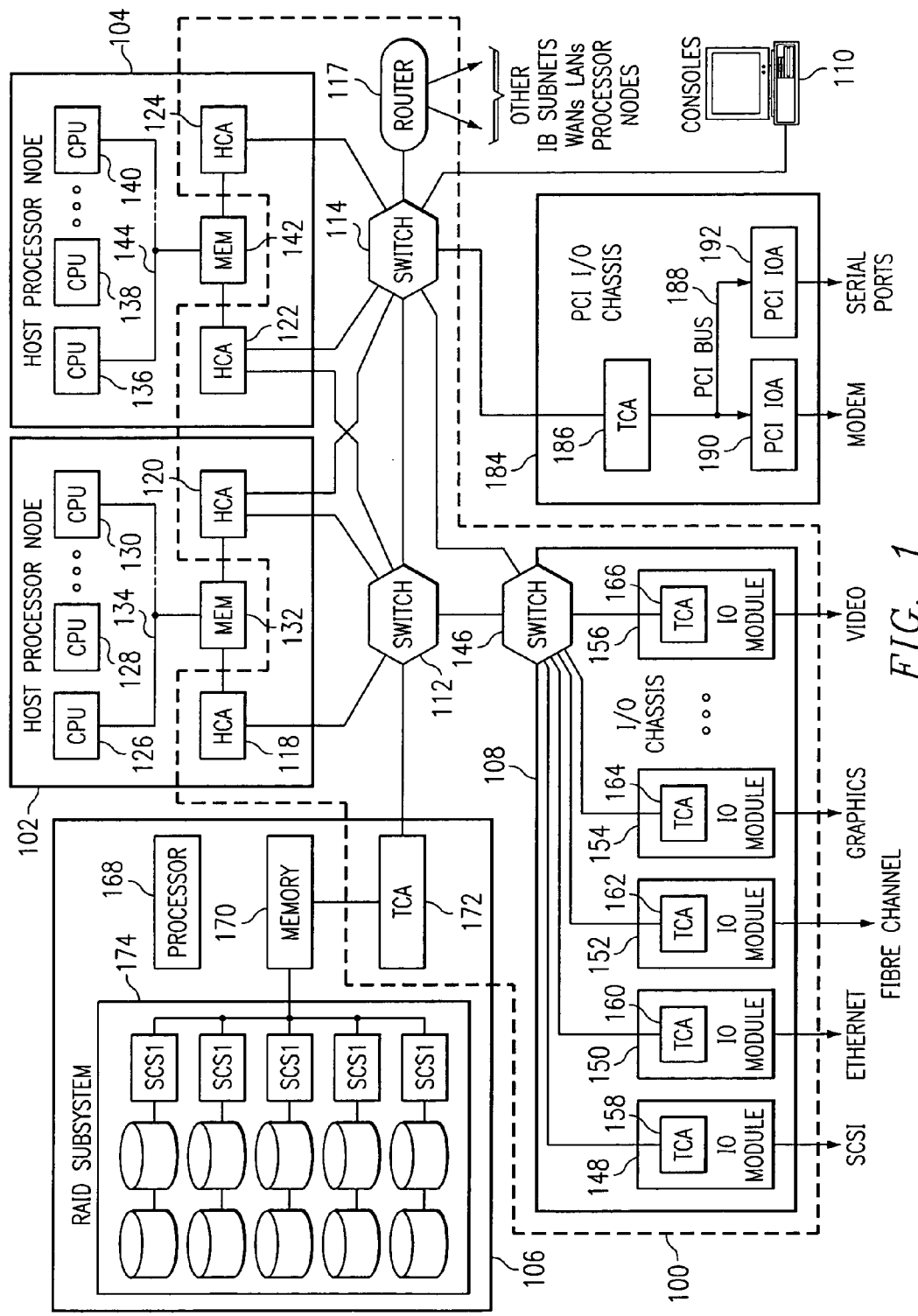
FIG. 1 depicts a diagram of a network computing system in accordance with a preferred embodiment of the present invention.

With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations.

SAN 100 is a high-bandwidth, low-latency network interconnecting nodes within the network computing system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, I/O chassis node 108, and PCI I/O Chassis node 184. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a network computing system. The SAN 100 shown in FIG. 1 includes a switched communications fabric 100, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, RAID I/O subsystem 106, I/O chassis 108, and PCI I/O Chassis 184 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144. Host channel adapter 118 provides a connection to switch 112, host channel adapters 120 and 122 provide a connection to switches 112 and 114, and host channel adapter 124 provides a connection to switch 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications. As indicated in FIG. 1, router 117 is coupled to wide area network (WAN) and/or local area network (LAN) connections to other hosts or other routers.

The I/O chassis 108 in FIG. 1 includes a switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop(FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

PCI I/O Chassis node 184 includes a TCA 186 and multiple PCI Input/Output Adapters (IOA) 190–192 connected to TCA 186 via PCI bus 188. In these examples, the IOAs take the form of adapter cards. Example adapter cards illustrated in FIG. 1 include a modem adapter card 190 and serial adapter card 192. TCA 186 encapsulates PCI transaction requests or responses received from PCI IOAs 190–192 into data packets for transmission across the SAN fabric 100 to an HCA, such as HCA 118. HCA 118 determines whether received data packets contain PCI transmissions and, if so, decodes the data packet to retrieve the encapsulated PCI transaction request or response, such as a DMA write or read operation. HCA 118 sends it to the appropriate unit, such as memory 132. If the PCI transaction was a DMA read request, the HCA then receives the response from the memory, such as memory 132, encapsulates the PCI response into a data packet, and sends the data packet back to the requesting TCA 186 across the SAN fabric 100. The TCA then decodes the PCI transaction from the data packet and sends the PCI transaction to PCI IOA 190 or 192 across PCI bus 188.

Similarly, store and load requests from a processor, such as, for example, CPU 126, to a PCI IOA, such as PCI IOA 190 or 192 are encapsulated into a data packet by the HCA 118 for transmission to the TCA 186 corresponding to the appropriate PCI IOA 190 or 192 across SAN fabric 100. The TCA 186 decodes the data packet to retrieve the PCI transmission and transmits the PCI store or load request and data to PCI IOA 190 or 192 via PCI bus 188. If the request is a load request, the TCA 186 then receives a response from the PCI IOA 190 or 192 which the TCA encapsulates into a data packet and transmits over the SAN fabric 100 to HCA 118 which decodes the data packet to retrieve the PCI data and commands and sends the PCI data and commands to the requesting CPU 126. Thus, PCI adapters may be connected to the SAN fabric 100 of the present invention.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

FIG. 1 is intended as an example, and not as an architectural limitation for the present invention and is provided merely for illustrative purposes. The embodiments of the present invention, as described below, may be implemented on computer systems of numerous types and configurations. For example, computer systems implementing the present invention may range from a small server with one processor and a limited number of input/output (I/O) adapters to a massive parallel supercomputer system or systems with, for example, hundreds of processor and thousands of I/O adapters. Furthermore, the present invention may be implemented in an infrastructure of remote computer systems connected by, for example, an internet or an intranet.

FIG. 2 depicts a functional block diagram of a host processor node in accordance with a preferred embodiment of the present invention. Host processor node 200 is an example of a host processor node, such as host processor node 102 in FIG. 1.

In this example, host processor node 200 shown in FIG. 2 includes a set of consumers 208–208 and one or more PCI/PCI-X device drivers 230, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 208–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 208–208 to process messages and other data. In addition, the channel adapter 210 and channel adapter 212 may receive load and store instructions from the processors which are targeted for PCI IOAs attached to the SAN. These bypass the verb layer, as shown in FIG. 2.

FIG. 3A depicts a diagram of a host channel adapter is depicted in accordance with a preferred embodiment of the present invention. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
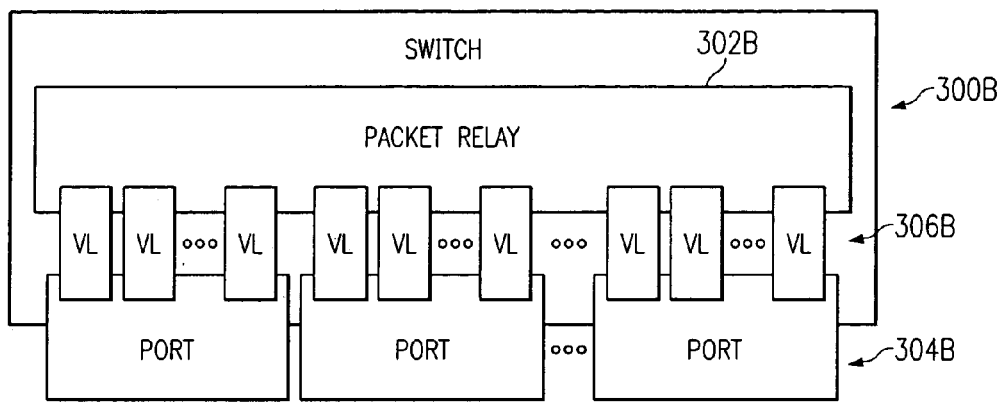
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
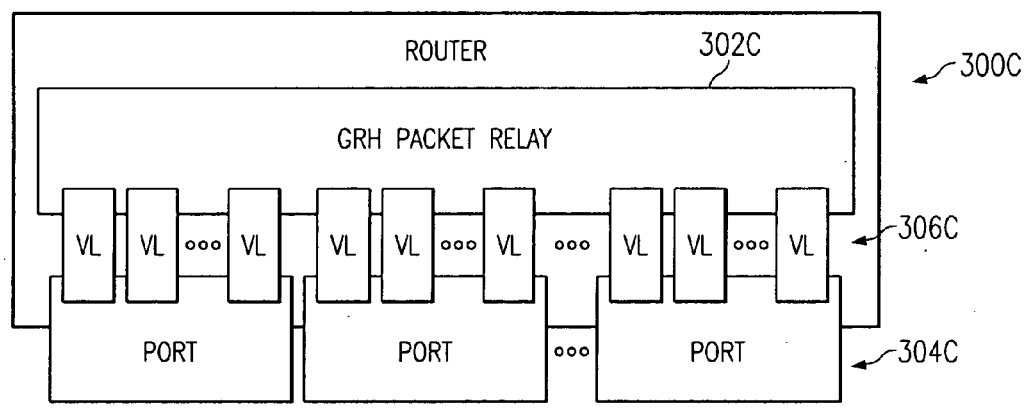
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
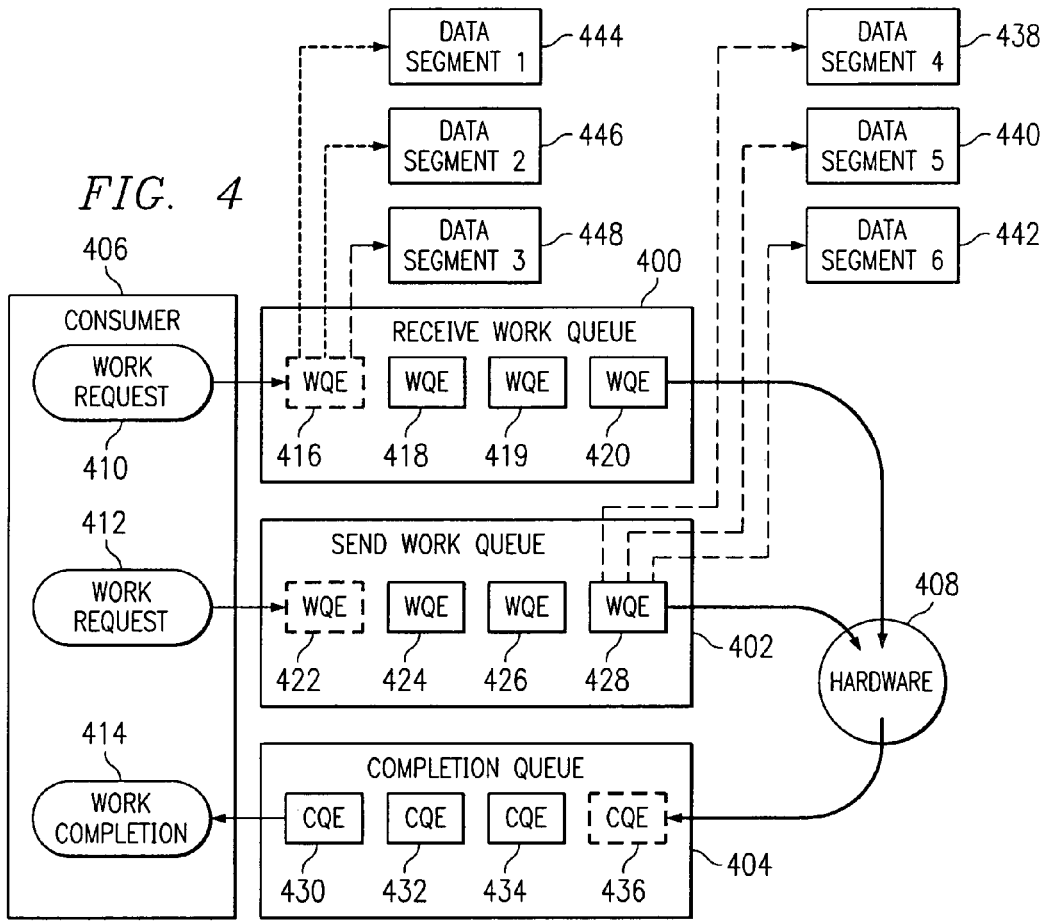
FIG. 4 depicts a diagram illustrating processing of work requests in accordance with a preferred embodiment of the present invention.

FIG. 4 depicts a diagram illustrating processing of work requests in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a network computing system implementing the present invention supports four types of transport services.

Reliable and Unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end-end (EE) context with one and only one remote end-end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $p^2 \times (N-1)$ queue pairs on each node. By comparison, the connectionless reliable datagram service only requires P queue pairs+(N-1) EE contexts on each node for exactly the same communications.

The unreliable datagram service is connectionless. The unreliable datagram service is employed by management applications to discover and integrate new switches, routers, and endnodes into a given network computing system. The unreliable datagram service does not provide the reliability guarantees of the reliable connection service and the reliable datagram service. The unreliable datagram service accordingly operates with less state information maintained at each endnode.

Figure 5:
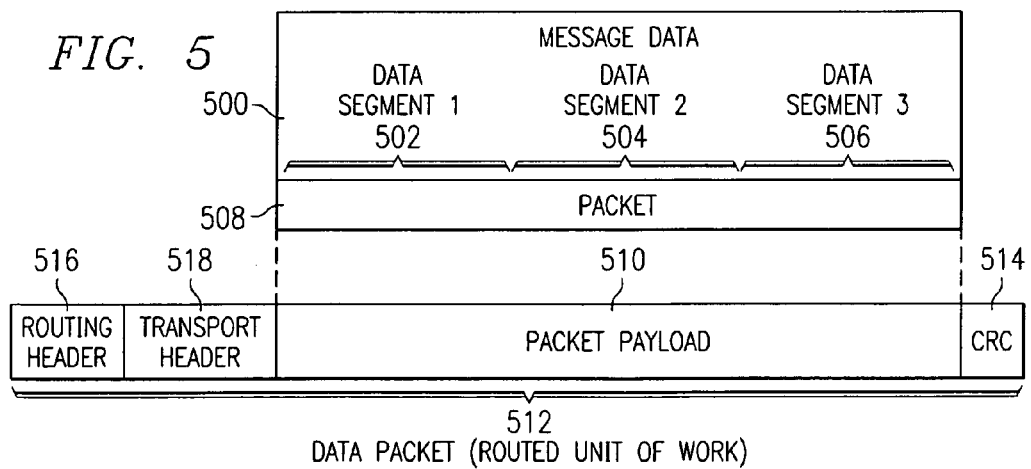
FIG. 5 depicts an illustration of a data packet in accordance with a preferred embodiment of the present invention.

FIG. 5 is an illustration of a data packet in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport 518 are present in data packet 512. Routing header 516 is used to identify source and destination ports for data packet 512. Transport header 518 in this example specifies the destination queue pair for data packet 512.

Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an endnode may be configured to be members of one or more possibly overlapping sets called partitions.

Figure 6:
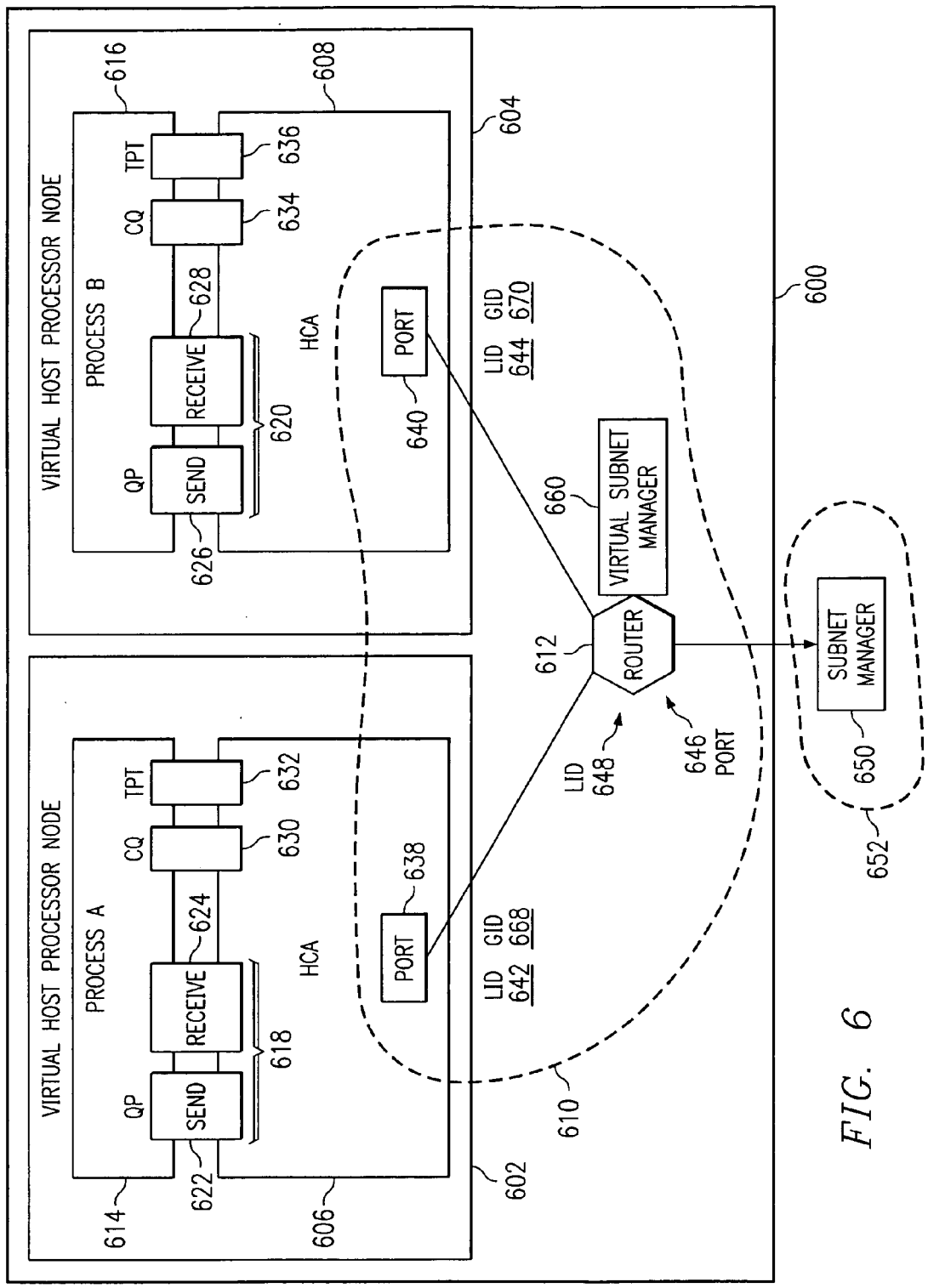
FIG. 6 depicts a diagram of a physical component with virtual channel adapters and virtual switches in accordance with an embodiment of the present invention.

FIG. 6 depicts a diagram of a physical component 600 with virtual channel adapters and virtual switches in accordance with an embodiment of the present invention. FIG. 6 illustrates an internal structure of a multi-function chip used to implement a virtual router that interconnects multiple virtual HCAs residing within a virtual subnet to a physical external fabric subnet. The term multi-function chip is used because the multi-function chip provides the functionality of one or more routers and multiple HCAs. Physical component 600 in FIG. 6 includes virtual host processor node 602 and virtual host processor node 604. Virtual host processor node 602 includes virtual host channel adapter (HCA) 606. Virtual host processor node 604 includes virtual host channel adapter (HCA) 608. Virtual HCAs 606 and 608 may have the same attributes as a physical HCA. For example, virtual HCAs 606 and 608, in this example, have mandatory queue pair numbers 0 and 1.

Physical component 600 in FIG. 6 includes a virtual SAN fabric 610 implementing a virtual IB subnet which includes router 612. Virtual subnet 610 in FIG. 6 includes a virtual link coupling host channel adapter 606 to router 612 and a physical link coupling router 612 to a separate physical subnet 652. Virtual HCA 606 includes virtual port 638. Virtual subnet manager 660 assigns virtual LIDs 642 and 644 to virtual ports 638 and 640, respectively. Subnet manager 650 plays no role in the virtual LID assignment of ports residing behind the (virtual) router 612 in a separate IB (virtual) subnet. Virtual subnet manager 660 also assigns virtual GIDs 668 and 670 to virtual ports 638 and 640, respectively. The (virtual) subnet 610 that these GIDs reside within is registered within the physical subnet's subnet manager 650, as residing behind router 612. Nodes residing within the physical subnet 652 must logically go through (virtual) router 612 to reach the virtual hosts within the (virtual) subnet 610.

In the example transactions, host processor node 602 includes client process A 614. Host processor node 604 includes a client process B 616. Client process A 614 interacts with host channel adapter hardware 606 through queue pair 618, completion queue 630 and Translation Protection Table (TPT) 632. Client process B 616 interacts with host channel adapter 608 through queue pair 620, completion queue 634 and TPT 636. Queue pair 618, queue pair 620, completion queue 630, completion queue 634, TPT 632 and TPT 636 are data structures. Queue pair 618 includes a send work queue 622 and a receive work queue 624. Queue pair 620 includes a send work queue 626 and a receive work queue 628. Completion queues 630 and 634 consist of a single completion queue. TPTs 632 and 636 consist of a memory address translation and protection table.

A multi-function chip may provide a resource configuration and allocation interface to software, firmware or a hardware state machine which will execute as part of physical component 600. The resource configuration and allocation interface allows software, firmware, or hardware state machines to set an operating policy for the virtual HCAs and routers, for example HCAs 606 and 608 in FIG. 6.

In one embodiment, there are two subnets of note, a real subnet 652, and a separate virtual subnet 610 that resides behind a multi-function InfiniBand chip. However, the present invention allows for multiple subnets to be virtualized in a similar fashion. At this point it is important to note that it is assumed that no subnets reside behind any virtual subnets (e.g., a virtual subnet is a leaf subnet within a subnet hierarchy).

In a preferred embodiment, only host channel adapters (HCAs) reside within a virtual subnet. However, virtualization of multiple devices (e.g., TCAs) may also reside behind a single IB node.

The appearance of separate virtual subnets is employed to cause global routing headers (GRHs) to be added to incoming and outgoing data packets. A GRH contains fields for routing the packet between subnets. These GRHs are sometimes used by inbound processing of a software router (e.g., router 612) to qualify specific virtual servers/virtual HCAs that reside behind a single multi-function chip. All nodes residing within a physical subnet (e.g., subnet 652) use standard router based techniques to communicate with virtual HCAs (e.g., HCAs 606 and 608) residing behind a virtual router, such as router 612 in FIG. 6.

In general, a router, such as router 612, is responsible for receiving data packets from one link and transmitting the data packets over another link that moves the data packets closer to their ultimate destination. This transmission of the data packets closer to their ultimate destination includes determining which link the packet needs to be forwarded to. This determination is made by using the target GID to query the subnet manager 660 in the newly reached subnet (e.g., subnet 610) when a request is initiated from within subnet 652, to find out how to reach the packet's ultimate destination. Each cross-IB subnet packet contains a GRH that defines the packet's ultimate destination GID. The information returned from the subnet manager includes the specific node's LID (i.e. the next hop) that is to be targeted within the new subnet so that a Local Router Header (LRH) can be formed. The router then replaces the original LRH of the packet being forwarded with the new LRH formed above and sends the packet over the appropriate new link. The LID targeted by the router in the new LRH may be either that of another router or the ultimate destination of the data packet as defined in the GRH.

When an entire subnet is virtualized, much of the traditional router processing and overhead, specifically the destination lookup and packet forwarding, can be bypassed (as described below).

Standard IB states that a physical subnet manager (e.g., subnet manager 650) supports at least static routes that define routers that are to be used to reach different subnets. A physical subnet administration query process includes matching the subnet portion of a target global identifier (GID) with these static routes when the target GID does not reside within the physical subnet 652. When a subnet match is found, path information describing a local identifier (LID) of the router is returned to the querying process. As InfiniBand processing dictates, a requesting node then builds data packets consisting of a LRH for the router, such as, router 612, followed by the GRH of the target destination, such as GID 668.

In order to minimize the development costs associated with chip design and development, a multi-function chip only requires small changes from a standard HCA design to enable software virtualization of entire subnet(s). One example of this enablement of software utilization is that the multi-function chip presents itself as a "router" to the physical subnet manager, instead of a HCA. Access is then provided to the physical fabric for a collection of virtual servers, otherwise called "guests," via that router.

The software behind the multi-function chip implements functionality of the router in addition to providing a subset of Subnet Manager (SM) functions for the subnets being virtualized. This software acts as a "Hypervisor" for the operating system images and virtual HCAs being supported. Due to chip design, the router function is implemented in such a way that the router is only involved in control-flow processing, such as connection setup, not mainline data flow processing. This is possible because each guest both resides behind a software router (via virtualized control flow QPs) and has direct access to the multi-function chip that resides on the physical subnet (all physical QPs other than the control flow QP). "Subnet Facade" may be used to describe this capability in which, from a management prospective, the guests reside within a separate subnet. However, from a mainline data flow perspective, router overheads are bypassed.

A single multi-function chip when combined with appropriate software performs both the network layer packet relay function of a router for traffic to and from the virtual subnets, and the QP end node transport layer function of a HCA for multiple guests. Virtual HCAs (e.g., virtual HCAs 606 and 608) are conceptual groupings of the physical QP resources implemented by the multi-function chip. All standard HCA functionality (e.g., verbs, RDMA, etc.) are provided by the multi-function chip directly to the guests, via these physical QPs, even though the guests logically reside behind the router. Once communications are established, data sent to/from guests is performed at native (i.e. non-cross-subnet) IB node throughput levels.

The Hypervisor provides the appearance of multiple virtual HCAs to the guests. These virtual HCAs have the same resource attributes as physical HCAs (e.g., HCA ports, P_Key table, etc.). However, since the HCAs are being virtualized, the Hypervisor can provide the ability to dynamically create these virtual HCAs as new guests are defined. The Hypervisor virtualizes the following activities: bootstrap defining of the virtual HCAs that are accessible to guests or operating system images; virtual HCA open processing; and creation of control flow virtual QPs (e.g. QP1).

Physical chip resource allocation, such as, for example, QP allocation, is shared across the multiple guests being virtualized. However, once allocated, individual resources are dedicated to a single guest. A single physical resource name space is shared among all guests. This means that once a physical QP number, for example "6", is assigned to a given guest, the number "6" may not be reused until the guest owning the number "6" frees it. The dedication of physical resources to a single guest is standard processing from the chip's perspective because occurrence of the guest virtualization is transparent to the chip. Using this model of chip resource allocation allows the chip to ignore the GRH information resident in arriving packets and instead use only the target physical QP number, which is now known to be unique across all subnets being virtualized by the multi-function chip. This implementation bypasses all of the look-up/forwarding overhead associated with a traditional router for mainline data flow processing.

Consideration is required when individual chip resources are assigned to allow guest level HCA access rights to be enforced upon guest initiated activities (e.g., on a QP or Memory Region basis) and guest level interrupts to occur for HCA initiated activities (e.g., on a per CQ basis). The allocation of chip resources is performed on either a per-request basis or as blocks of resources. This assignment of the chip's resources could either be static or dynamic. Dynamic assignment per request provides an optimal physical resource utilization.

The Hypervisor also provides a subset of Subnet Manager functions for the guests and virtual HCAs residing within the virtual subnet. These functions include, for example, assigning GIDs and GUIDs to the guests and assigning virtual LIDs for communication among guests within the virtual subnet.

The present invention simplifies complexities associated with traditional subnet environments because, in the present invention, an entire subnet is implemented in software. An example of this simplification is that a P_Key structure of a physical subnet is used in the virtual subnet. This allows access rights of guests to be clearly mapped to the physical subnet devices and hosts.

As is noted above, the control-flow QP (e.g., QP1) resource is virtualized by the Hypervisor. The single chip implemented control-flow QP must be shared by all guests in such a way that each guest perceives that it has its own separate control-flow QP. This sharing is performed by the software virtual router demultiplexing arriving control-flow packets based upon the target GID, to the appropriate virtualized guest specific control-flow QP. This control-flow processing is the only time that the GRH included in all cross-subnet packets is accessed.

Figure 7:
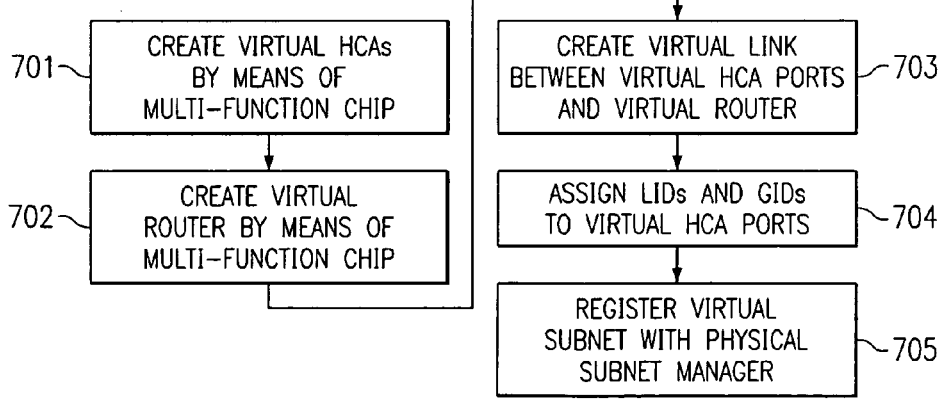
FIG. 7 depicts a flowchart illustrating an overview of the process of virtualization of host channel adapters and routers in accordance with the present invention.

Referring to FIG. 7, a flowchart illustrating an overview of the process of virtualization of HCAs and routers is depicted in accordance with the present invention. Virtual HCAs are created by the multi-function chip (step 701). As stated above, in addition to HCAs, a plurality of other types of devices may be virtualized by the single multi-function chip. A virtual router is also created by the multi-function chip (step 702). Virtual links are then established between the virtual HCAs' ports and the virtual routers, thus establishing a virtual subnet (step 703). The virtual subnet manager assigns virtual LIDs and GIDs to the virtual HCA ports (step 704). The virtual subnet is then registered with a physical subnet manager as residing behind the virtual router (step 705). As stated above, the physical subnet sees the mutli-function chip only as a router. Multiple virtual subnets may be virtualized by the multi-function chip, resulting in even greater end node partitioning.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for partitioning a computer network end node, the method comprising:
   virtualizing a plurality of network devices on a single multi-function chip by means of a combination of hardware and software to form virtual network devices;
   virtualizing at least one router on the single multi-function chip by means of a combination of hardware and software to form a virtual router,
   wherein the virtual router performs control-flow processing for the virtual network devices,
   wherein the virtual router functions of destination lookup and packet forwarding are incurred only on control-flow processing, and
   wherein the virtual network devices and the virtual router form a virtual subnet; and
   registering the virtual subnet with a physical subnet,
   wherein the physical subnet perceives the single multi-function chip as only a single router with multiple Host Channel Adapters residing behind the single router.

2. The method according to claim 1, wherein the virtual network devices are host channel adapters.

3. The method according to claim 1, wherein the virtual network devices are target channel adapters.

4. The method according to claim 1, further comprising assigning unique identifiers to the virtual network devices.

5. The method according to claim 1, further comprising virtualizing a plurality of subnets on the single multi-function chip by means of software.

6. The method according to claim 1, wherein nodes in the physical subnet communicate with the virtual subnet through the virtual router.

7. The method according to claim 1, wherein the single multi-function chip provides resource configuration and allocation interface that allow software, firmware and hardware state machines to set an operating policy for the virtual network devices.

8. The method according to claim 1, wherein the single multi-function chip provides standard device functions directly to the virtual network devices by means of physical queue pairs even though those devices logically reside behind a virtual router.

9. A computer program product in a computer readable storage medium for use in a data processing system, for partitioning a computer network end node, the computer program product comprising:
   instructions for virtualizing a plurality of network devices on a single multi-function chip to form virtual network devices;
   instructions for virtualizing at least one router on the single multi-function chip to form a virtual router,
   wherein the virtual router performs control-flow processing for the virtual network devices,
   wherein the virtual router functions of destination lookup and packet forwarding are incurred only on control-flow processing, and
   wherein the virtual network devices and the virtual router form a virtual subnet; and
   instructions for registering the virtual subnet with a physical subnet,
   wherein the physical subnet perceives the single multi-function chip as only a single router with multiple Host Channel Adapters residing behind the single router.

10. The computer program product according to claim 9, wherein the virtual network devices are host channel adapters.

11. The computer program product according to claim 9, wherein the virtual network devices are target channel adapters.

12. The computer program product according to claim 9, further comprising instructions for assigning unique identifiers to the virtual network devices.

13. The computer program product according to claim 9, further comprising instructions for virtualizing a plurality of subnets on the single multi-function chip by means of software.

14. The computer program product according to claim 9, wherein nodes in the physical subnet communicate with the virtual subnet through the virtual router.

15. A system for partitioning a computer network end node, the system comprising:

a first virtualizing component which virtualizes a plurality of network devices on a single multi-function chip to form virtual network devices;

a second virtualizing component which virtualizes at least one router on the single multi-function chip to form a virtual router, wherein the virtual router performs control-flow processing for the virtual network devices, and wherein the virtual router functions of destination lookup and packet forwarding are incurred only on control-flow processing, wherein the virtual network devices and the virtual router form a virtual subnet; and a registering component which registers the virtual subnet with a physical subnet, wherein the physical subnet perceives the single multi-function chip as only a single router with multiple Host Channel Adapters residing behind the single router.

* * * * *